United States Patent [19]

Fischer et al.

[11] Patent Number: 4,482,923
[45] Date of Patent: Nov. 13, 1984

[54] METHOD FOR AUTOTYPICAL TONAL VALUE ANALYSIS

[75] Inventors: Gerhard Fischer, Offenbach; Karl Scheuter, Darmstadt, both of Fed. Rep. of Germany

[73] Assignee: Dr. Ing. Rudolf Hell GmbH, Fed. Rep. of Germany

[21] Appl. No.: 245,643

[22] PCT Filed: Jul. 29, 1980

[86] PCT No.: PCT/DE80/00110
§ 371 Date: Mar. 31, 1981
§ 102(e) Date: Mar. 24, 1981

[87] PCT Pub. No.: WO81/00466
PCT Pub. Date: Feb. 19, 1981

[30] Foreign Application Priority Data

Jul. 31, 1979 [DE] Fed. Rep. of Germany ....... 2931098

[51] Int. Cl.$^3$ .............................................. H04N 1/40
[52] U.S. Cl. .................................................. 358/283
[58] Field of Search .......................... 358/283, 96, 280

[56] References Cited

U.S. PATENT DOCUMENTS

| | | | |
|---|---|---|---|
| 3,715,475 | 2/1973 | Prause | 358/283 |
| 3,736,375 | 5/1973 | Parnet | 358/96 |
| 3,739,084 | 6/1973 | Heinrich | 358/283 |
| 4,032,978 | 6/1977 | Wong | 358/283 |
| 4,033,443 | 7/1977 | Bunge et al. | 358/283 |
| 4,084,259 | 4/1978 | Cahill et al. | |
| 4,342,051 | 7/1982 | Suzuki et al. | 358/283 |

OTHER PUBLICATIONS

Machol-Pseudo Halftone for Representing Continuous Tone Images in Black White Facsimile Systems-IBM Tech. Discl. Bull., vol. 9, #6, Nov. 1966, pp. 636-637.

Smith-Halftone Image Produced by Pseudo-Random Bit Generator-IBM Tech. Discl. Bull., vol. 17, #7, Dec. 1974, pp. 1858-1859.

Primary Examiner—Joseph A. Orsino, Jr.
Attorney, Agent, or Firm—Hill, Van Santen, Steadman & Simpson

[57] ABSTRACT

Method for producing a printing form by means of scanning a master and the recording surfaces in accord with a scanning raster or, respectively, a conforming recording raster upon employment of a random generator for the distribution of smallest points which are still printable to each raster field of the recording surface, whereby the plurality of said points which are still printable determines the respective tonal value and each raster field at the original side is resolved by means of fine-scanning into surface elements and the elements of approximately identical tonal value are combined to form sub-surfaces. Each raster field at the recording side is composed of surface elements and sub-surfaces, whereby the surface elements of the sub-surfaces at the recording side receive tonal values corresponding in terms of statistical mean, in that the sub-surfaces on the recording side, statistically distributed, are filled with a corresponding plurality of smallest points still printable.

6 Claims, 5 Drawing Figures

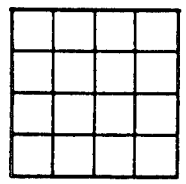
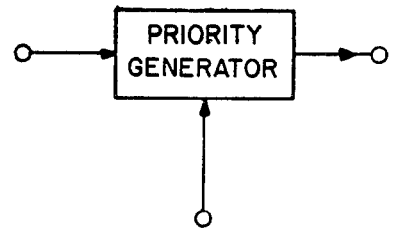
FIG.3
FIG.4
FIG.5

METHOD FOR AUTOTYPICAL TONAL VALUE ANALYSIS

BACKGROUND OF THE INVENTION

1. Field of the Invention

The present invention relates to a method for producing a printing form by means of scanning an original and the recording surfaces in accord with a scanning or, respectively, conforming recording raster upon employment of a random generator for the distribution of the smallest points which are still printable to each raster field of the recording surface, whereby the plurality of said points which are still printable determines the respective tonal value.

2. Description of the Prior Art

Autotypical tonal value analysis is now executed with the assistance of regular rasters to a large degree. It is only for special purposes, for example, for facsimile printing, that high frequency rasters, i.e., rasters with a high spatial frequency of the raster points or, respectively, image information are still employed with an irregular structure (for example, German OS No. 19 21 642; German OS No. 16 22 340). The raster constant is usually selected in such manner that, upon consideration of the printability properties of the printing materials and of the density scale, optimum reproduction properties ensue. The statistical distribution of the raster points is undertaken with the assistance of a random generator.

Predominantly employed contact screens and intersecting line screens are the cause of disadvantageous density skips which occur when the points exposed on begin to contact one another. This effect can be reduced by means of changing the shape of the point, for example, chain point form.

In multicolor printing, partial images are printed on top of one another. Thereby, upon employment of regular rasters, raster points come to lie next to one another or on top of one another in a regular interchange, so that regular patterns become perceptible. Their size is determined by the raster constants and by the angulation difference of the rasters employed. They are called Moiré. Even given optimum angulation differences as described, for example, in the German LP No. 20 12 728 (corresponds to U.S. Pat. No. 4,084,183), a residual Moiré, so-called rosettes remain. Particularly given half-wise surface coverage and the standard raster constants which take the printability properties into consideration, the residual Moiré can still be easily seen from a normal observation distance and is therefore considered to be disturbing.

Further, a method has been specified in the trade journal "RCA Review", September 1970, Vol. 31, No. 3, pages 517 through 533, in which, with the assistance of a random generator, the surface of the raster field is composed of a different number—said number corresponding to the tonal value—of identical points of the size of the smallest printable point. In terms of surface, the smallest printable point covers approximately 4 through 8% of the standard raster field size, i.e., a maximum of 25 such smallest printable points to be exposed can be accommodated on this surface. In turn deriving therefrom is the fact that only 25 stages of tonal value are possible. This, however, is not sufficient for a high-grade reproduction, since skips in tonal value occur within the reproduced image at the boundaries of tonal values. A further disadvantage of this method consists therein that, given a high tonal value, the smallest surface remaining free within the raster field cannot be kept large enough so that printing ink flows in it or bleeds into it, which leads to a further reduction of the exploitable tonal value steps.

Overall, it can be stated that, upon employment of high frequency rasters, i.e., rasters with a high spatial frequency with an irregular structure, no Moiré occurs since these rasters themselves are not periodic, but that such rasters have previously hardly been employed because of deficient linearity, poor reproducibility and their relatively slight density scale. They are almost exclusively employed, as already mentioned, for special purposes, for example, for facsimile printing or for graphic output in electronic data processing.

SUMMARY OF THE INVENTION

The object of the present invention is to develop a method for autotypical tonal value analysis which avoids the said disadvantages.

The subject matter of the present invention is a method which is characterized in that each raster field on the original side is resolved by means of fine-scanning into surface elements and the elements are combined to form sub-surfaces of approximately equal tonal value; and in that each raster field on the recording side is also composed of surface elements and sub-surfaces, whereby the surface elements of the sub-surfaces on the recording side receive tonal values corresponding in the statistical mean, in that the sub-surfaces on the recording side, statistically distributed, are filled with a corresponding plurality of smallest points which are still printable.

It is provided in an advantageous manner that each raster field at the original side is resolved into surface elements in accord with the desired detail resolution. Moreover, an advantageous further development of the method consists therein that, for the statistical distribution of the smallest still printable points on the sub-surfaces, the raster field on the recording side is subdivided into matrix elements corresponding to the number of still-printable points which fit in and in that, by means of a random generator, a number corresponding to the continuous tonal value steps is allocated to each such matrix element (if need be, constantly repeated in an altered form), a decision being made when said number is reached concerning the printing or non-printing of the appertaining smallest point which is still printable.

The inventive method can also be characterized in detail by the combination of the following steps.

Opto-electronic scanning of a master and control of the recording by means of density values gained from the scanning, whereby the recording ensues by means of printing points randomly disposed within a recording or, respectively, reference surface and the scanning of the master ensues in individual surface elements which take the desired detail resolution into consideration; combination of the surface elements of a scanning area to form a reference surface;

comparison in terms of tonal value of the surface elements of one reference surface to one another;

combination and storage of surface elements with approximately identical density value to form partial areas of the reference surfaces.

Formation of a random matrix of n×m elements, whereby the plurality of matrix elements at least corresponds to the plurality of density steps employed in the reproduction, and whereby numerical values are allocated to the elements of the matrix, said numerical values being smaller than or equal to the plurality of matrix elements, said numerical values being randomly allocated to the elements in a known manner;

comparison of the density values of the stored partial areas to the numerical values of the matrix, whereby a binary matrix arises for each partial area, in which matrix the elements are identified which lie within the partial area and whose density value is smaller than or equal to the numerical value of the random matrix;

by means of combining the binary matrices of the partial areas, a printing matrix is produced for the reference surface and the recording of the printing points is controlled in a known manner by the printing matrix.

Thereby, in accord with the invention, the allocation of the numerical values to the elements of the random matrix can be continuously altered.

Moreover, advantageous further developments of the invention are also described in claims 4–7.

Further features of the invention are disclosed below in conjunction with the description of the invention.

BRIEF DESCRIPTION OF THE INVENTION

In the following, the invention is explained in greater detail on the basis of FIGS. 1 through 5. There are shown:

FIG. 1 an illustration of the apparatus for resolution of the scanning surface into individual surface elements of identical gray scale values;

FIG. 2 an example for obtaining the printing matrix from the various partial printing matrices;

FIG. 3 a block diagram for the creation of a priority matrix from the matrix of reference surfaces;

FIG. 4 a block diagram for gaining the printing matrix from the priority matrix;

FIG. 5 a block diagram for the formation of new printing matrices from a given printing matrix.

DESCRIPTION OF THE PREFERRED EMBODIMENTS

Figure 1:
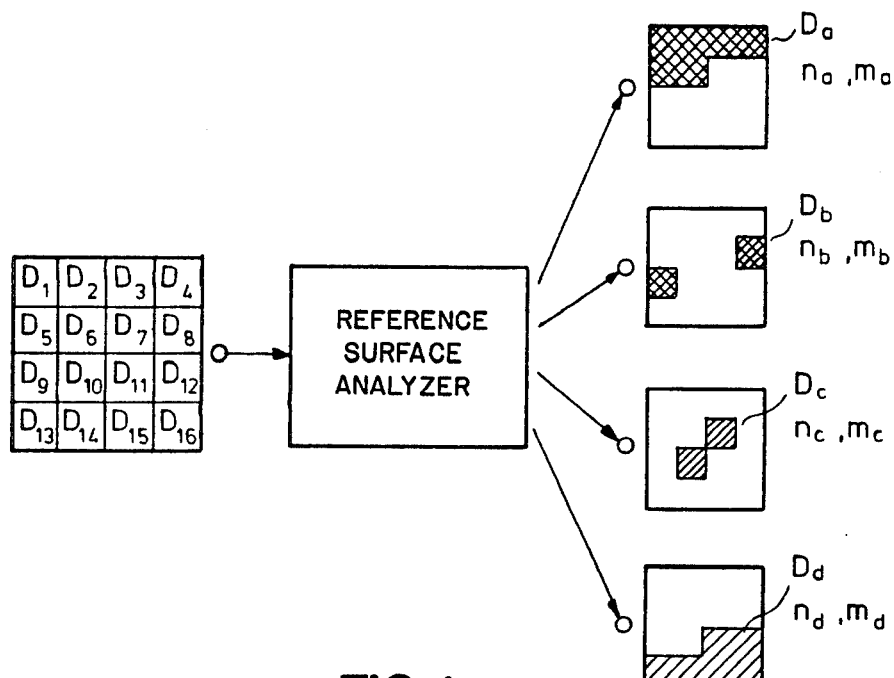

In order to understand the invention, let the interrelationships underlying the invention and the sequence of the method be specified first. A density modulation which is realized with the assistance of a modulation of the spatial frequency of the smallest printable point is employed in the recording. What is meant by the smallest printable point is a point which is certain not to be perceived as a point from a normal observation distance but which, however, is printable on the respective printing material and is sufficiently reproducible.

The surface $A_o$ of the smallest printable point depends both on the material properties, for example, of the printing ink and of the printing material, as well as on the printing conditions, for example, printing speed, and on environmental conditions. However, it is generaly constant within one printing form. The actual surface of the smallest printable point is subject to statistical fluctuations. A probable surface, however, can be specified.

If $A_o$ is the surface of the smallest printable point, then one can define a reference surface $A_v$ which meets conditions $A_v = nA_o$. Thus, an elemental surface $A_o = A_v/n$ corresponds to the point to be printed. The plurality $n+1$ of the reproducible gray scales derives from the surface ratio $A_v/A_o$. Each gray scale is given by the plurality m of points of the surface $A_o$ printed within the reference surface. If n is selected sufficiently large, then the density skips of following density steps can no longer be visually perceived.

The shape of the reference surface must meet the condition that a gap-free connection to the neighboring reference surfaces is guaranteed. In general, it is meaningful to match the shape of the smallest printable point and the shape of the reference surface to one another.

Only a few printed elemental surfaces lie in the reference surface in the range of gray scales of low density and only a few unprinted elemental surfaces, accordingly, lie in the range of gray scales of high density. In mean gray scales, printed and non-printed elemental surfaces frequently alternate A high frequency raster of the spatial frequency results, so that, even given a regular arrangement of the printed elemental surfaces, the residual Moiré no longer becomes perceptible given a normal observation position.

The degrees of freedom of the inventive method are only limited by the power of resolution of the eye and by the properties of the printing material. Said degrees of freedom are the surface $A_o$ and the shape of the smallest printable point, the size of the reference surface $A_v = n \cdot A_o$ and its shape, as well as the selection of the m elemental surfaces to be printed within the reference surface. On principle, all degrees of freedom can be exploited for the optimum reproduction of a density value. For practical employment of the inventive method, approximately the following sequence of decisions is recommendable:

(1) determination of the minimum number K of density steps required for the reproduction of a master with the desired quality.

(2) Identification of the surface $A_o$ of the smallest printable point upon consideration of the material properties and printing conditions.

(3) Identification of the reference surface $A_v = n \cdot A_o$ with $n+1 = K$.

(4) Identification of the shape of the reference surface and of the smallest printable point.

The following decisions then remain for the reproduction of each individual surface element of the master:

(5) Identification of the gray scale m from the density of the surface element of the master.

(6) Identification of the positions of the m points to be printed within the reference surface.

When the size of the reference surface $A_v = n \cdot A_o$ and the gray scale m are known, then the plurality P of the positioning possibilities is given by $P = n! - m! - (n-m)!$.

The plurality of positioning possibilities is greatest in the range of mean surface coverage, i.e., $m/n \approx 0.5$.

The statistical mean of the distance R between two directly adjacent printed points depends both on the degree of surface coverage $\phi = m/n$ as well as on the surface $A_o$ and is calculated for the degree of surface coverage $\phi \leq \frac{1}{2}$ at $R = \sqrt{(m/n) \cdot A_o}$.

Analogously, the statistical mean distance R' between two non-printed elemental surfaces for degrees of surface coverage $\phi \geq \frac{1}{2}$ is calculated at $$R' = \sqrt{\frac{n}{n-m} \cdot A_o}.$$

In the dimension points per length unit, it derives from the statistical mean distance R of the printed points at $f = 1/R$ for degrees of surface coverage $\phi \leq \frac{1}{2}$ and derives at $f=1/R'$ for surface coverage factors from the statitistical mean distance $R'$ of the non-printed elemental surfaces.

The raster frequency is greatest in the range of mean surface coverage. Thus, the residual Moiré occurring given completely regular positioning despite an optimum raster angulation is not perceptible at a normal observation distance.

The great advantage of the inventive method is that the arrangement of the m points to be printed which are necessary for generating the $m^{th}$ gray scale within the reference surface are not subject to any limitation because of their non-perceptibility. The arrangement, therefore, can also be a purely stochastic one, whereby Moiré is fundamentally avoided even without raster rotation.

In practice a complete suppression of the Moiré is not always necessary. In many cases, Moiré is admissible under condition that all occurring Moiré periods are sufficiently long compared to the dimensions of the image. In the practical application of the inventive method, a quasi-stochastic arrangement of the printing points often suffices.

In the following, several possibilities for implementing the method and the devices required thereto are illustrated.

FIG. 3 shows that the computer can also contain a priority generator which orders the matrix of the reference surface in such manner that a separate priority is allocated to each element of the matrix of the reference surface. By so doing, a priority matrix with n elements arises, said n elements exhibiting n different priorities. Said priorities can be randomly selected or according to prescribed rules. If a priority matrix already exists, then it suffices to again randomly interchange to priorities of its elements, for example, with the assistance of a random generator which randomly selects one or more change possibilities from prescribed change possibilities, or to interchange said priorities according to prescribed rules. The priority matrix can be supplied to a priority computer which—in accord with the gray scale m—characterizes elements of the priorities 1 through m in the printing matrix.

FIG. 4 shows that the computer can also contain a priority computer which identifies m different elements in a printing matrix in accord with and from a given priority matrix of the desired gray scale m. Said characterization can ensue according to prescribed, i.e., programmable rules which are then executed either in a random sequence which is generated by a random generator or, on the other hand, in a prescribed sequence.

FIG. 5 shows that the computer can also contain a position computer which interchanges the elements of a given printing matrix according to prescribed rules of change but, however, in a random sequence which a random generator can generate or, on the other hand, in a prescribed sequence.

If one drives the computer and the exposure device with a freely selectable, i.e., programmable clock, then the known possibilities of free selection of the enlargement and reduction are available.

The size and shape of the smallest printable point is set in a known manner, for example, by means of optical concentration by focusing of the printing light beam.

In view of the greatest possible plurality of reproducible gray scales, it is meaningful to dimension the reference surface sufficiently large.

Thus, for representing, for example, $m=101$ gray scales, the reference surface must exhibit $n=100$ elemental surfaces. On the other hand, the reproduction of small details can also make a smaller reference surface size seem desirable. The inventive method admits both possibilities.

The surface section of the master corresponding to the reference surface is expediently scanned in individual surface sections corresponding to the desired detail resolution and the density values of the individual surface sections are then compared to one another. If they are nearly identical, then their mean value is further processed as the density value of the overall reference surface. If, however, individual surface sections are encountered with significant differences of density, then these are individually further processed.

For this purpose, the matrix of the reference surface is first dissected into sub-matrices which correspond to the surface sections of the master resulting from the desired detail resolution, so that the sub-matrices can be combined to form partial matrices with density values which are respectively nearly identical. In the computer, each partial matrix and the mean density value corresponding to it is processed in such manner as was disclosed above for the overall matrix of the reference surface. The partial printing matrices thereby arising are then combined to form the printing matrix of the overall reference surface.

The consequence of the division of the reference surfaces is that the plurality of possible gray scales is smaller in each surface section the greater said surface section is but, on the other hand, it remains unchanged for the overall reference surface. Since, however, the eye can only perceive the smaller surface sections given great differences of density, a few gray scale values suffice for detail reproduction.

The division of the reference surface and apparatus therefore is shown in FIG. 1. It is executed, for example, by a reference surface analyzer. As an input signal, said analyzer receives the mean density value of each surface section from the memory on the left side of the drawing which has $4\times4$ image points. Internally, it orders the surface sections according to nearly identical density values and calculates the corresponding mean value of the density for each group of nearly identical density values. Its output signals are the control magnitudes $n_i$ and $m_i$ required for generating each partial matrix. At the same time, it must relay the information concerning the arrangement of the partial matrices within the reference surface to the computer for the generation of the partial printing matrices. These subareas of the memories are shown on the right of FIG 1. The reference surface analyser is merely a simple comparator.

Figure 2:
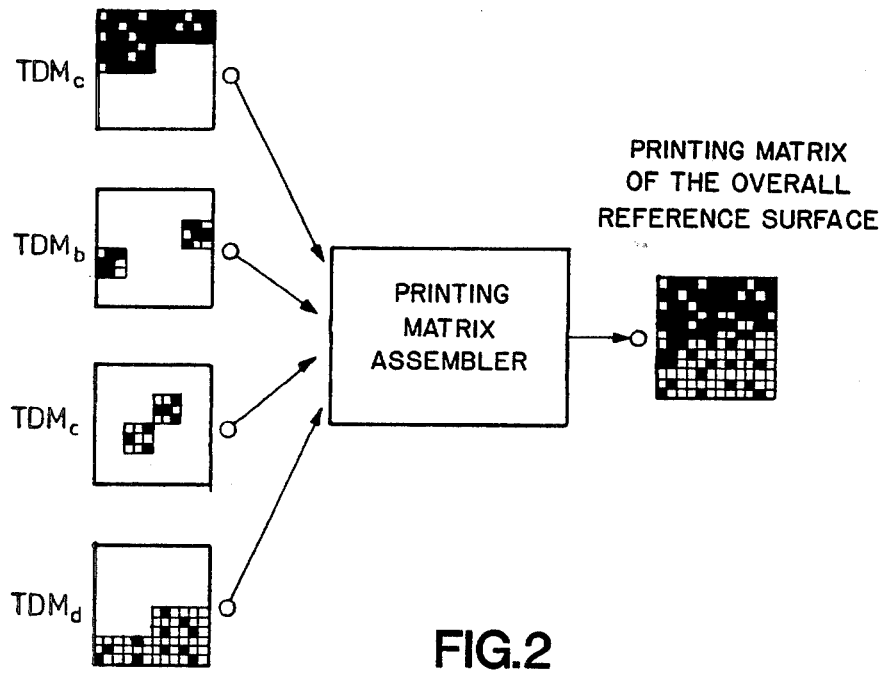

FIG. 2 shows a printing matrix assembler in which the printing matrix of the overall reference surface is again subsequently regenerated from the individual partial printing matrices. This unit is merely an adder which combines the partial matrices TDMa-TDMd on the left side of the drawing to form the input to the memory with a size equal to the size of the printing matrix on the right side of FIG. 2 which has $12\times12$ memory positions, for example.

For implementing the method, known scanners can be employed, for example, in scanning the original. Thus, for example, the scanner type DC 300 of Dr. Ing. Rudolf Hell GmbH, Kiel, Federal Republic of Germany, can be employed in which the light reflected or allowed to pass by the original master is subdivided in accord with the progressive colors. The light components allocated to the color separations are then respectively supplied to a color computer and are processed there. Usually, correction computers follow, these being partially automatically and partially manually controllable and allow a random influence of the output signal of the color computer. Color and correction computers generate analog or digital signals which respectively correspond to the corrected density value, i.e., to the desired gray scale m.

In the known device, said signals drive an exposure device as described in the German LP No. 21 07 738 (corresponds to U.S. Pat. No. 3,725,574) which likewise shows the overall structure.

If the raster generator of FIG. 1 of the German LP No. 21 07 738 which is also described in the German LP No. 20 12 728 (corresponds to U.S. Pat. No. 4,084,183) in these commercially available scanners is replaced with the inventive raster generator, then the inventive method can be directly realized without further inventive effort and without additional experiments. Both the scanning and the recording unit can be incorporated unchanged. This can ensue by means of change-overs which are respectively provided at the input and output of the raster computer, should both operating modes, namely, conventional rastering and the inventive rastering, be desired, or the connection of the inventive raster unit can ensue directly to the digital output of the scanning unit and the drive of the multi-track recording unit. Of course, it lies within the framework of the invention to provide a plurality of scanning units functioning in parallel which undertake a multi-track scanning with the desired detail resolution in the device DC 300 (or, respectively, German LP No. 21 07 738) in order to be able to execute the scanning field $D_1$ through $D_{16}$ of FIG. 9 of the present invention quickly instead of with a scanning taking longer with only a single scanning element. The existing multi-track recording unit can also be provided with a greater plurality of individual recording elements which then leads to an overall increase of the work speed.

Since each individual recording element of the multi-track scanning unit in the known device DC 300 (German LP No. 21 07 738) can be individually driven, it is possible to employ the printing matrix of the inventive method without undertaking a structural change of the recording unit. The recording of the smallest point which is still printable is possible by means of noting the trace unblanking time of the individual recording beams, this proceeding from FIG. 2A of the German LP No. 21 07 738.

We claim:

1. A method for reproducing printing forms by means of scanning an original in accord with a scanning raster and by means of scanning a recording surface in accord with a conforming recording raster comprising the steps of:
   (a) resolving each raster field of the original by means of fine scanning into surface elements in accord with the desired detail resolution,
   (b) combining said surface elements which have approximately identical tonal values to form subsurfaces,
   (c) storing said subsurfaces of approximately identical tonal values,
   (d) composing each raster field of the recording site of surface elements and subsurfaces corresponding to the subsurfaces of the scanning site,
   (e) allocating to each subsurface element of the surfaces of the recording site a recording signal determining whether for this surface element a point which is still printable is or is not recorded, by filling up the surface elements of the recording site with a statistical distribution of said recording signals by means of a random generator whereby a subsurface receives a number of smallest printable points which correspond in statistical mean to the tonal values of the respective stored subsurfaces of the scanning site, and
   (f) controlling the recording of said printing poins by reading out said recording signals.

2. A method according to claim 1, wherein the smallest printable points have the shape of a regular hexagon.

3. A method for producing a printing form by means of autotypical tonal value analysis in which a master is opto-electrically scanned and the recording is controlled by the density value obtained during scanning, whereby the recording occurs by means of printing points randomly arranged within a reference surface, characterized by the following steps:
   (a) the master is scanned in individual surface elements which take the desired detail resolution into consideration;
   (b) the surface elements of a scanning area are combined to form a reference surface;
   (c) the surface elements of a reference surface are compared in tonal value to one another;
   (d) surface values with approximately the same density value are combined to form partial areas of the reference surfaces and are stored;
   (e) a random matrix of n×m elements is formed, whereby the plurality of matrix elements at least corresponds to the plurality of density steps employed in the reduction, and whereby numerical values are allocated to the elements of the matrix, said numerical values being smaller than or equal to the plurality of matrix elements and said numerical values being randomly allocated to the elements in a known manner;
   (f) the density values of the stored partial areas are compared to the numerical values of the matrix, whereby a binary matrix arises for each partial area, in which matrix the elements are characterized which lie within the partial area and whose density value is smaller than or equal to the numerical value of the random matrix;
   (g) a printing matrix is produced for the reference surface by means of adding the binary matrices of the partial areas; and
   (h) the recording of the printing points is controlled in a known manner by the printing matrix.

4. A method according to claim 3, characterized in that the smallest printable points have the shape of a regular hexagon.

5. A method according to claim 3, characterized in that the allocation of the numerical values to the elements of the random matrix is continuously changed.

6. A method according to claim 5, characterized in that the allocation of the numerical values to the elements of the numerical matrix is continuously changed, in that
   (a) the numerical values of its elements or
   (b) the sequence of its columns or
   (c) the sequence of its rows are interchanged or
   (d) a random combination of the above interchanges are executed, whereby the sequence of the interchanges is prescribed.

* * * * *